(12) United States Patent
Grohs

(10) Patent No.: US 6,659,662 B2
(45) Date of Patent: Dec. 9, 2003

(54) INTERNET DISTRIBUTION OF PRINT JOB TO MULTIPLE PRINT SHOPS BASED ON GEOGRAPHIC LOCATION OF DOCUMENT RECIPIENTS

(75) Inventor: Randall E Grohs, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 34 days.

(21) Appl. No.: 10/003,788

(22) Filed: Oct. 31, 2001

(65) Prior Publication Data

US 2003/0081974 A1 May 1, 2003

(51) Int. Cl.[7] .......................... B41J 11/44; G06F 15/00; G06F 15/16
(52) U.S. Cl. ..................... 400/76; 358/1.15; 709/203; 709/208
(58) Field of Search ............................. 400/61, 70, 76, 400/62; 709/203, 208, 223, 200, 219, 220, 224, 225, 226; 358/1.13, 1.14, 1.15, 1.2, 407

(56) References Cited

U.S. PATENT DOCUMENTS

2002/0078160 A1 * 6/2002 Kemp et al. ............... 709/208
2002/0090240 A1 * 7/2002 Lively ......................... 400/76
2002/0103697 A1 * 8/2002 Lockhart et al. ............... 705/14
2002/0105658 A1 * 8/2002 Jackson et al. ............... 358/1.2
2002/0174076 A1 * 11/2002 Bertani ......................... 705/400
2002/0186402 A1 * 12/2002 Jackson et al. ............. 358/1.15

* cited by examiner

Primary Examiner—Andrew H. Hirshfeld
Assistant Examiner—Hoai-An Nguyen

(57) ABSTRACT

A system includes a plurality of print service providers and a print job oversight and analysis center. The print job oversight and analysis center is adapted to, in response to receiving a job requiring printing and delivering documents, determining geographic locations of recipients of the documents and selecting a subset of the print service providers to print the documents and send the documents to the recipients. Each of the print service providers in the subset of print service providers prints documents for a subset of the recipients. The documents are apportioned among the subset of print service providers based on the geographic locations of the recipients of the documents so as to coordinate delivery time from the subset of print service providers to the recipients.

23 Claims, 2 Drawing Sheets

INTERNET DISTRIBUTION OF PRINT JOB TO MULTIPLE PRINT SHOPS BASED ON GEOGRAPHIC LOCATION OF DOCUMENT RECIPIENTS

BACKGROUND OF THE INVENTION

The present invention pertains to access to network communication and pertains particularly to the internet distribution of a print job to multiple print shops based on the geographic location of document recipients.

The Internet started as a cooperative research effort of the United States Federal Government known as the Advanced Research Project Agency Network (ARPAnet). The ARPAnet tied universities and research and development organizations to the U.S. military establishment. More recently, the Internet has extended its use commercially and internationally. It is the world's largest computer network.

A Uniform Resource Locator (URL) address is an Internet address. A URL address consists of a string expression that designates a resource (referred to herein as a URL page) on the Internet. For example the resource is a particular file on a computer connected to the Internet.

Web browsers such as Netscape Navigator browser available from Netscape, and Internet Explorer browser available from Microsoft Corporation use URL addresses to access resources (URL pages) on the Internet. The World Wide Web (Web) allows users to navigate Internet resources intuitively, without using internet protocol (IP) addresses or other special technical knowledge. The Web is made up of interconnected web pages, or web documents stored on web servers. These pages are accessed with the use of a web browser.

Commercial print jobs can be submitted to a print shop an in person customer, a phone call, an interaction with a web page, an electronic mail (e-mail) message, a facsimile transmission (fax) and so on. Typically all the printing for a print job is performed at a single print shop. If the print shop provides shipping services, the print shop may place the resulting documents in the mail for distribution to the intended recipients. Delivery can often require delivery of print copies over a wide geographic area.

Since postal rates for many types of mail distribution within the United States are not based on distance geographic proximity between a sender and receiver. However, delivery time often does vary based on geographic distance between a sender and receiver. Additionally, in some cases postage does vary based on geographic locations. For example, for letters sent outside the United States, postage can be significantly higher. Also, for some classes of mail, cost of mailing does vary based on geographic distance between the source and destination of mail.

SUMMARY OF THE INVENTION

In accordance with the preferred embodiment of the present invention, a system includes a plurality of print service providers and a print job oversight and analysis center. The print job oversight and analysis center is adapted to, in response to receiving a job requiring printing and delivering documents, determining geographic locations of recipients of the documents and selecting a subset of the print service providers to print the documents and send the documents to the recipients. Each of the print service providers in the subset of print service providers prints documents for a subset of the recipients. The documents are apportioned among the subset of print service providers based on the geographic locations of the recipients of the documents so as to coordinate delivery time from the subset of print service providers to the recipients.

DETAILED DESCRIPTION OF THE PREFERRED EMBODIMENT

Figure 1:
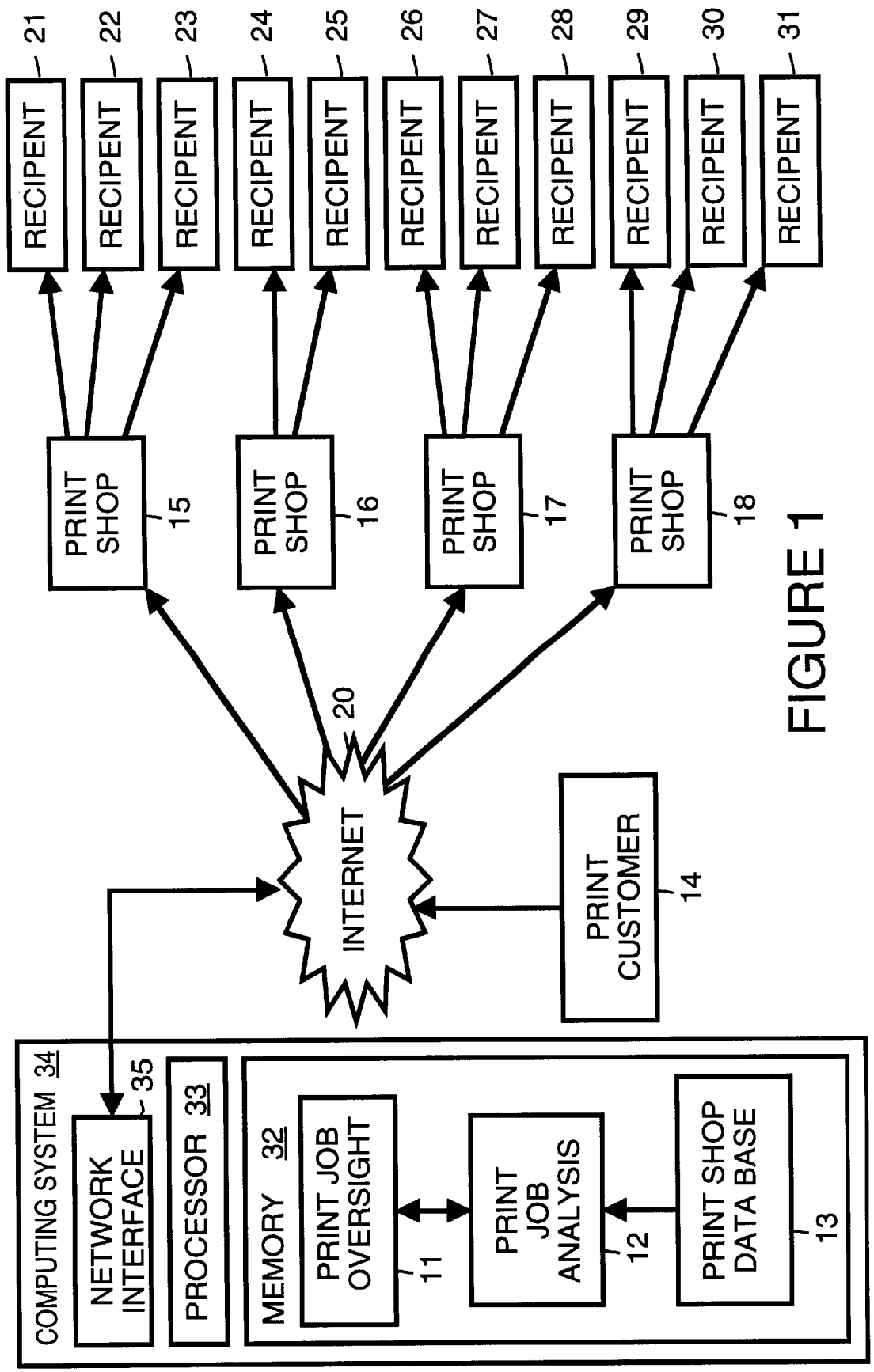
FIG. 1 is a simplified block diagram that illustrates distribution of print jobs to print shops based on the geographic location of document recipients in accordance with a preferred embodiment of the present invention.

FIG. 1 is a simplified block diagram that illustrates distribution of print jobs to print shops based on the geographic location of document recipients. A print shop is any provider of printing services. A print job originates with a print customer 14. Print customer 14 contacts print job oversight center 11 with a print job request. For example, print customer 14 contacts print job oversight center 11 through the internet 20, for example by interaction with a web page or sending an electronic mail (e-mail) message. Alternatively, print customer 14 can contact print job oversight center 11 through an in-person visit, a phone call, a facsimile transmission (fax) and so on.

Print job oversight center 11 uses print job analysis function 12 to determine which print job shop to use in order to perform the actual printing. Multiple print shops may be used for print jobs that require distribution to recipients over a wide geographic area. In making determinations, print job analysis function 12 uses a print shop database 13 that gives information about print shops. The information stored within print shop database 13 includes, for example, pricing information, geographic location of the print shop, and estimated delivery information for mailings.

For example, print job oversight center 11, print job analysis function 12 and print shop database 13 are implemented within a single computing system 34. A memory 32 of the computing system is used to store print shop database 13 and programs that implement print job analysis 12 and print job oversight 11. A processor 33 of computing system 34 is used to run the programs that implement the function of print job oversight center 11 and print job analysis function 12. Connection with internet 20 is performed through a network interface 35 of computing system 34.

The estimated delivery information allows coordination of delivery time for print jobs with recipients that are distributed over a wide geographic area. This is illustrated in FIG. 1 where recipients located geographically near print shop 15 are represented by a recipient 21, a recipient 22 and a recipient 23. Recipients located geographically near print shop 16 are represented by a recipient 24 and a recipient 25. Recipients located geographically near print shop 17 are represented by a recipient 26, a recipient 27 and a recipient 28. Recipients located geographically near print shop 18 are represented by a recipient 29, a recipient 30 and a recipient 31.

Figure 2:
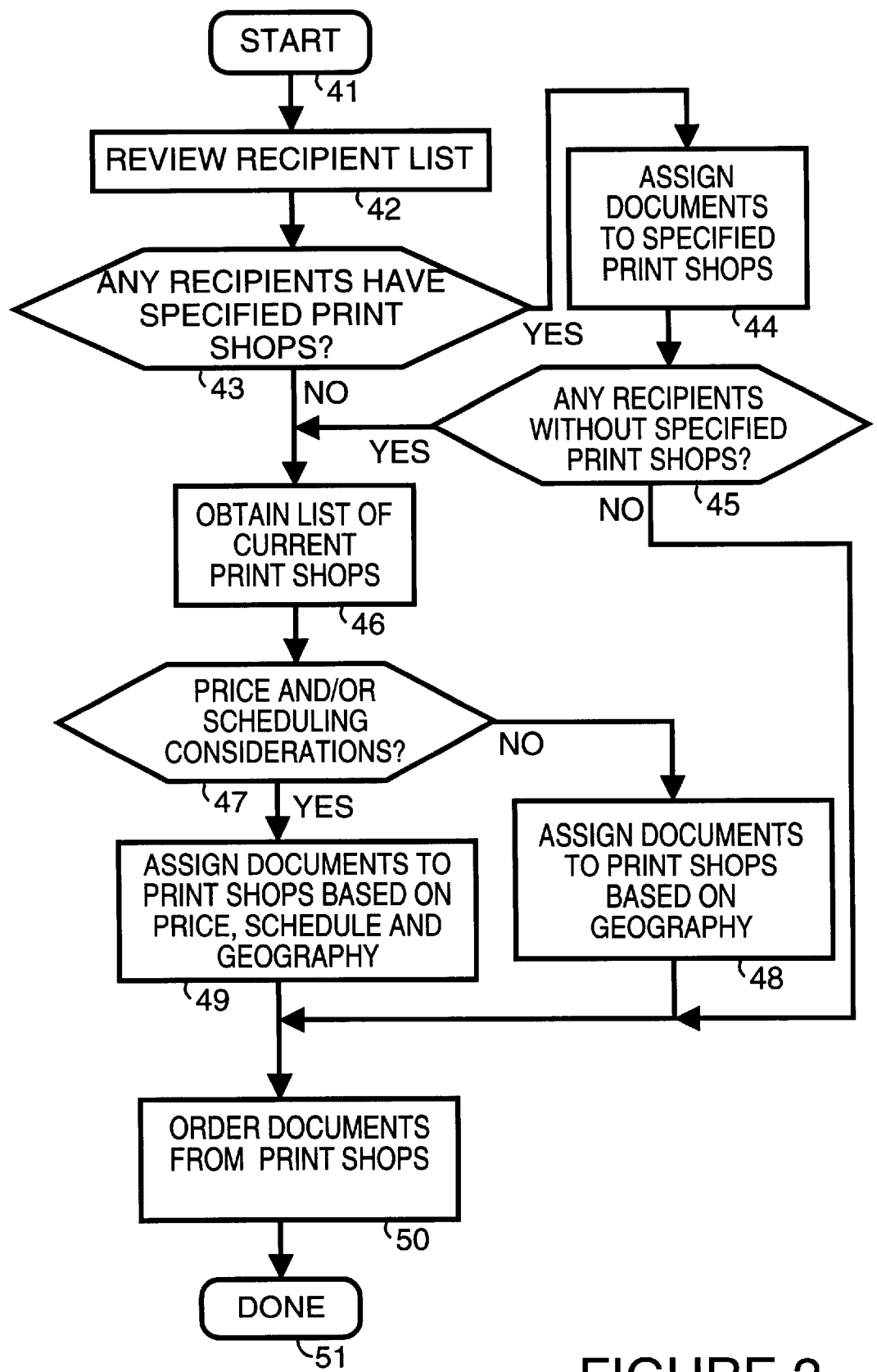
FIG. 2 is a simplified flowchart that illustrates print job analysis performed prior to distribution of print jobs to print shops based on the geographic location of document recipients in accordance with a preferred embodiment of the present invention.

FIG. 2 is a simplified flowchart that illustrates print job analysis performed prior to distribution of print jobs to print shops based on the geographic location of document recipients. In a step 41 the print job analysis starts. In a step 42 a recipient list for the print job is reviewed. The recipient list can include one recipient for the job up to many thousands or even millions of recipients.

In a step 43 a determination is made as to whether any recipients have specified print shops. For example, when the only recipient is the print customer, the print customer may desire to specify a local print shop to perform the job. The print customer may also have one or more preferred print shops to perform the work. Alternatively, the customer may perform its own analysis to select print shops to perform job portions and deliver to specified recipients. Whatever reason the customer has, step 43 allows the customer to select print shops for all or any portion of the recipients.

If some or all of the recipients have specified print shops, in a step 44, documents to go to recipients for which print shops have been specified are assigned to the specified print shops. In a step 45 a check is made to see if there are any remaining recipients for which print shops have not been specified. If there are no remaining recipients for which print shops have not been specified, in a step 50, an order is prepared to send the documents to the assigned print shops.

If in step 43 no recipients have specified print shops or if in step 45 there are remaining recipients for which print shops have not been specified, then in a step 46 information on currently available print shops is obtained, for example, from print shop database 13. The information includes, for example, pricing information, geographic location of the print shop, and estimated delivery information for mailings. For example, geographic location is indicated by the mailing address of the recipient. The estimated delivery information, for example, can list estimated delivery time for each zip code. If the print shop is not in the United States, the estimated delivery time can be listed based on some other part of the address (city, province, other mailing code, etc.) as a substitute for zip codes.

Alternatively, the estimated delivery information may include only those zip codes of regions close to the print shop. In this case, all the zip codes are divided up and assigned to the closest (i.e., closest in delivery time) print shop.

In a step 47, a check is made to see whether price and/or scheduling is a consideration when selecting print shops. Price may be a concern, for example, when there is a disparity in the prices charged by print shops. When print shops charge the same price for similar work and/or when any price fluctuations in prices are so minimal as to not impact a customers decisions, it is not necessary to factor in price when assigning documents to print shops. Scheduling is a concern when the time to complete portions of a print job vary significantly between print shops.

When there are not price or scheduling considerations, in a step 48 documents are assigned to print shops based on geography. The goal is typically to divide the documents among print shops in such a way that the documents will arrive to each recipient as soon as possible. However, if it is desired that shipments arrive to all recipients on a particular day, some adjustment in which job shops are used or a delay in shipment of a portion of documents may be necessary to assure this result.

When there are price and/or scheduling considerations, in a step 49 documents are assigned to print shops based on geography, scheduling and/or price. Price can be considered for example, based on a maximum price per copy specified by a customer. Alternatively, a customer is allowed to specify that minimum cost be incurred resulting in only those print shops with the lowest price being used. A balance can also be struck between cost and estimated delivery time so that both are taken into account. For example, a customer may be willing to pay incrementally (but not significantly) more for faster delivery to all recipients. When necessary, a customer can be queried for sufficient information to perform this balancing. Scheduling is considered, for example, by adding any scheduling delays in printing to the estimated delivery time when estimating how long it will take to get documents to particular recipients. Other considerations, for example, different countries with different language requirements can also be taken into consideration.

In step 50, once all documents for the print job have been assigned to print shops, an order is prepared to send the documents to the assigned print shops. In a step 51, the print job analysis is complete.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for printing and delivering documents comprising the following steps:
   (a) determining geographic locations of recipients of the documents; and,
   (b) selecting a plurality of print shops to print the documents and send the documents to the recipients, each of the print shops in the plurality of print shops printing documents for a subset of the recipients, the documents being apportioned among the plurality of print shops based on the geographic locations of the recipients of the documents determined in step (a) so as to coordinate delivery time from the print shops to the recipients.

2. A method as in claim 1, additionally comprising the following step:
   (c) sending orders to the print shops to print the documents, the orders being sent via an electronic network.

3. A method as in claim 1 wherein step (b) includes the following substep:
   (b.1) taking into account projected scheduling delays of printing the documents by the print shops when calculating delivery time from the print shops to the recipients.

4. A method as in claim 1 wherein step (b) includes the following substep:
   (b.1) excluding first print shops from being included in the plurality of print shops based on prices the first print shops charge for printing and sending the documents.

5. A method as in claim 1 additionally comprising the following step:
   (c) storing information about the print shops within a database, the information about the print shops being used in step (b) for selecting the plurality of print shops.

6. A method as in claim 1 wherein in step (b) the delivery time from the print shops to the recipients is coordinating by minimizing the delivery time from the print shops to the recipients.

7. A system comprising:
   a plurality of print service providers; and,
   print job oversight and analysis center, the print job oversight and analysis center being adapted to, in response to receiving a job requiring printing and delivering documents, determining geographic locations of recipients of the documents and selecting a subset of the print service providers to print the documents and send the documents to the recipients;

wherein each of the print service providers in the subset of print service providers printing documents for a subset of the recipients, the documents being apportioned among the subset of print service providers based on the geographic locations of the recipients of the documents so as to coordinate delivery time from the subset of print service providers to the recipients.

8. A system as in claim 7, wherein the print job oversight and analysis center sends orders to the subset of print service providers to print the documents, the orders being sent via an electronic network.

9. A system as in claim 7 wherein the print job oversight and analysis center takes into account projected scheduling delays of printing the documents by the subset of print service providers when calculating delivery time from the subset of print service providers to the recipients.

10. A system as in claim 7 wherein the print job oversight and analysis center excludes first print service providers from being included in the subset of print service providers based on prices the first print service providers charge for printing and sending the documents.

11. A system as in claim 7 wherein the print job oversight and analysis center stores information about the print service providers within a database, the information about the print service providers being used by the print job oversight and analysis center for selecting the subset of print shops.

12. A system as in claim 7 wherein the print job oversight and analysis center coordinates the delivery time from the subset of print service providers to the recipients by minimizing the delivery time from the subset of print service providers to the recipients.

13. Storage media storing software which when executed performs a method for overseeing printing and delivering documents, the method comprising the following steps:

(a) determining geographic locations of recipients of the documents; and, (b) selecting a plurality of print shops to print the documents and send the documents to the recipients, each of the print shops in the plurality of print shops printing documents for a subset of the recipients, the documents being apportioned among the plurality of print shops based on the geographic locations of the recipients of the documents determined in step (a) so as to coordinate delivery time from the print shops to the recipients.

14. Storage media as in claim 13, wherein the method additionally comprises the following step:

(c) sending orders to the print shops to print the documents, the orders being sent via an electronic network.

15. Storage media as in claim 13 wherein step (b) includes the following substep:

(b.1) taking into account projected scheduling delays of printing the documents by the print shops when calculating delivery time from the print shops to the recipients.

16. Storage media as in claim 13 wherein step (b) includes the following substep:

(b.1) excluding first print shops from being included in the plurality of print shops based on prices the first print shops charge for printing and sending the documents.

17. Storage media as in claim 13, wherein the method additionally comprises the following step:

(c) storing information about the print shops within a database, the information about the print shops being used in step (b) for selecting the plurality of print shops.

18. A computing system comprising:

a memory, the memory storing information about print service providers and storing programs which implement print job oversight and analysis;

a processor, which when running the programs which implement print job oversight and analysis, in response to a job order requesting printing and delivering documents, determines geographic locations of recipients of the documents and selects a subset of the print service providers to print the documents and send the documents to the recipients so that each of the print service providers in the subset of print service providers is selected to print documents for a subset of the recipients, the documents being apportioned among the subset of print service providers based on the geographic locations of the recipients of the documents so as to coordinate delivery time from the subset of print service providers to the recipients; and, a network interface for connecting to a network, the computing system using the network interface to communicate through the network to the print service providers.

19. A computing system as in claim 18, wherein the network interface is used to send orders to the subset of print service providers to print the documents, the orders being sent via the network.

20. A computing system as in claim 18 wherein the processor, when running the programs which implement print job oversight and analysis, takes into account projected scheduling delays of printing the documents by the subset of print service providers when calculating delivery time from the subset of print service providers to the recipients.

21. A computing system as in claim 18 wherein the processor, when running the programs which implement print job oversight and analysis, excludes first print service providers from being included in the subset of print service providers based on prices the first print service providers charge for printing and sending the documents.

22. A computing system as in claim 18 wherein the memory includes a database into which is stored the information about the print service providers.

23. A computing system as in claim 18 wherein the processor, when running the programs which implement print job oversight and analysis, coordinates the delivery time from the subset of print service providers to the recipients by minimizing the delivery time from the subset of print service providers to the recipients.

* * * * *